June 23, 1936.  J. W. LOGAN, JR  2,045,155
BRAKE CONTROLLING DEVICE
Filed Jan. 26, 1935   3 Sheets-Sheet 3

INVENTOR
JOHN W. LOGAN, JR.
BY *Wm. M. Cady*
ATTORNEY

Patented June 23, 1936

2,045,155

UNITED STATES PATENT OFFICE 2,045,155

BRAKE CONTROLLING DEVICE

John W. Logan, Jr., Edgewood, Pa., assignor to The Westinghouse Air Brake Company, Wilmerding, Pa., a corporation of Pennsylvania Application January 26, 1935, Serial No. 3,589

30 Claims. (Cl. 303—3)

This invention relates to brake controlling devices, and more particularly to means for controlling a combined fluid pressure and electric brake system intended for railway trains and traction vehicles.

Where railways trains and traction vehicles are equipped with a friction type brake, there is always considerable danger of causing sliding of the wheels when the brakes are applied. Wheel sliding may be caused by applying the brakes with too great a braking force for the then existing speed, or by a failure to reduce the initial braking force as the speed of the vehicle or train decreases and the coefficient of friction between the rubbing parts of the brakes increases. Sliding of the wheels is objectionable in that the retarding force of sliding wheels is less than that of rolling wheels, and also in that flat places are worn on the wheel treads thereby rendering the wheels unfit for regular service.

It is well known that not all of the wheels are caused to slide, and tests with trains show that only a relatively few number of wheels actually slide. However, it is desirable that no wheels shall slide, and there has heretofore been proposed a number of devices for either preventing or correcting sliding of individual wheels. These devices have all dealt principally with the control of friction type brakes and operate to release the friction brakes upon the sliding of a wheel or pairs of wheels.

There is however one type of brake which is self-correcting as regards sliding of the wheels and which does not require the use of auxiliary devices for reducing the braking force when the wheels associated with the brake begin to slip. This type brake is that commonly referred to as the eddy current brake, which has now become well known in the art. It is characteristic of the eddy current brake that the braking torque diminishes to zero at zero rotational speed, so that if this type of brake only be applied the wheels will not actually slide, although they may slip.

If the rail surface is too slippery for full braking torque of the eddy current brake, then the wheels will slip on the rails and begin rotating at a speed lower than that corresponding to the speed of the vehicle. The rotational speed of the slipping wheels will diminish until the eddy current braking torque has decreased sufficiently to balance the then existing friction between wheels and rails. As soon as the slippery portion of the rail is passed over, or if sand is applied to the rails, the friction between the slipping wheels and rails is increased and the speed of the wheels will also increase, so that the eddy current braking will improve. If the friction between wheels and rails increases sufficiently, the wheels will return to their normal speed. It will thus be seen that when braked by an eddy current brake the wheels will always be kept rolling, and the retarding force of the wheels will be that due to rolling wheels instead of that due in part to sliding wheels.

While an eddy current brake may be designed to operate very effectively over a wide range of speeds, it is well known that as the speed of the vehicle diminishes a point will be reached at some low speed where the eddy current braking effect diminishes, first slowly and then rapidly, until at zero speed the eddy current brakes will be ineffective to hold the vehicle at rest if on a slight grade. It is therefore customary to employ a friction brake which is cut into action at the very end of the deceleration period and held applied thereafter to hold the vehicle or train at rest. This insures that adequate braking will be produced to bring the vehicle or train to a stop on grades.

Braking equipments employing both an eddy current brake and a friction brake have heretofore been proposed, the friction brake being cut into action when the braking effect of the eddy current brake diminishes below a predetermined value. In these combined braking equipments there is a danger that the friction brake will be undesirably cut into action when the braking effect of one or more eddy current brakes reduces due to slipping of a number of the wheels. This will of course aggravate the wheel slipping condition and cause the wheels to lock and thus slide.

It is a principal object of this invention to provide a combined eddy current and friction brake equipment in which the friction brakes are cut into action when the eddy current braking effect decreases below a predetermined value, but which prevents the friction brakes from being cut into action when slipping wheels cause a diminution in the eddy current braking effect during the time when the eddy current brakes are normally effective.

Another object of this invention is to provide a novel interlock mechanism between the eddy current brakes and the friction brakes.

A further object of the invention is to provide a novel arrangement of inertia operated devices for controlling both the eddy current brakes and the friction brakes, and for insuring their operation at the proper times.

Other specific objects and advantages of the invention will appear more fully from the following description, which is taken in connection with the attached drawings, wherein, Figures 1A and 1B, taken together, show in schematic and somewhat diagrammatic form a view of apparatus comprising one embodiment of the invention.

Referring now to the drawings, and considering the apparatus there shown briefly at first, I have shown in diagrammatic form four eddy current type brakes represented by windings 10 and rotors 12, and four brake cylinders 14. This embodiment is illustrated in connection with a vehicle having four axles, in which one brake cylinder and one eddy current brake is intended to be associated with each axle.

For controlling the supply of current to the windings 10 I have provided a current controlling device 16, and for controlling the supply of fluid under pressure to the brake cylinders 14, I have provided a self-lapping brake valve device 18 and relay valve devices 20.

In order to provide for an interlock between the eddy current brakes and fluid pressure brakes so that the fluid pressure brakes are cut into action when the eddy current brakes diminish in effectiveness below a predetermined value, but which prevents cutting in of the fluid pressure brakes when the effectiveness of the eddy current brakes is diminshed due to wheel slipping alone, I have provided a magnet valve device 24, electrical relays 26, 28 and 30, and an inertia operated mechanism 32.

For adjusting the inertia operated mechanism 32, to determine the changeover from the eddy current brakes to the fluid pressure brakes, and for operating the current controlling device 16 and the brake valve device 18, to vary, respectively, the current supplied to the eddy current brake devices, and the fluid pressure supplied to the brake cylinders, I have provided a control mechanism 34.

For applying both the eddy current brakes and the fluid pressure brakes when an emergency application is effected I have provided a cut-off valve device 22.

Considering now more in detail the apparatus enumerated above, each eddy current brake device comprises a winding 10 and a rotor 12, while friction brakes are operated by brake cylinders 14. Each eddy current brake and each friction brake may be constructed to operate independently of each other, or they may be combined as in the manner shown in my Patent No. 2,012,747.

The current controlling device 16 is embodied in a casing having an operating shaft 36 upon which is rigidly mounted a drum 37 having secured thereto and insulated therefrom and from each other contact segments 38 and 39. The contact segment 38 is adapted to engage and bridge contact fingers 40, and the contact segment 39 is adapted to bridge and connect together similar contact fingers 41, and to thereafter sequentially engage other similar contact fingers 42 to cut out, progressively, portions of a resistance 43. The contact fingers 40, 41 and 42 are insulated from each other and from the casing of the current controlling device 16 by an insulating member 44, as shown in the drawings.

Each of the relay valve devices 20 is embodied in a casing having disposed therein a poppet valve 46 for controlling the flow of fluid under pressure from a valve chamber 47 to a second chamber 48. The valve chamber 47 is connected to a source of supply of fluid under pressure, as for example a reservoir 49, and when the poppet valve 46 is in unseated position, fluid under pressure may flow from the chamber 47, and reservoir 49, to the chamber 48. The valve 46 is normally held in seated position by a spring 50, and is adapted to be actuated to unseated position by pressure applied to valve stem 51.

Disposed in the chamber 48 is a slide valve 52, which controls communication between the chamber 48 and the atmosphere by way of exhaust port 53.

For actuating the slide valve 52 and for unseating the poppet valve 46, there is provided a piston 54 disposed in a piston chamber 55, and provided with a stem 56 having collars thereon adapted to engage slide valve 52 with a lost motion movement, and having an end 57 adapted to engage the valve stem 51. For guiding movement of the piston 54, the stem 56 is provided with a guiding piston 58 slidably disposed in a bore 59, and apertured at 60 to provide for the flow of fluid under pressure from the chamber 48 to a chamber 61 to the left of the piston 54.

The cut-off valve device 22 is embodied in a casing provided with a slide valve chamber 64 and a piston chamber 65. Disposed in the slide valve chamber 64 is a slide valve 66, and disposed in the piston chamber 65 is a piston 67 for operating the slide valve 66. The piston 67 is provided with a stem 68, which is recessed to receive the slide valve 66. A spring 69 engages the end of the stem 68 to urge the piston 67 to a biased position to the left. The piston 67 is actuated to the right, against opposition of spring 69, by the supply of fluid above a predetermined pressure to piston chamber 65.

The magnet valve device 24 is embodied in a casing provided with a supply valve 70 and a release valve 71 suitably connected so that a spring 72 urges the supply valve toward seated position and the release valve toward unseated position. In the upper part of the valve device casing is an electromagnet, which when energized actuates a stem 73 downwardly to seat the release valve 71 and to unseat the supply valve 70.

The self-lapping brake valve device 18 is embodied in a casing defining a pressure chamber 75, and is provided with a supply valve 76 adapted to control the supply of fluid under pressure from a supply chamber 77 to the pressure chamber 75. The supply valve 76 is urged toward seated position by a spring 78, and the supply valve chamber 77 is connected to the reservoir 49 by way of pipe 74.

In another part of the casing there is provided a movable abutment 80, in the form of a piston, operatively disposed in a chamber 81 and subject on one side to pressure from a spring 82 and on the other side to pressure from the pressure chamber 75. The tension on the spring 82 may be regulated by a regulating member 83, and movement of the movable abutment 80 to the right may be regulated by an adjustable stop 84.

Interiorly of the movable abutment 80 is a release valve 86, urged toward an unseated position by a spring 87. When the release valve 86 is in unseated position, the pressure chamber 75 is in communication with the atmosphere, by way of passages 88, chamber 81, and exhaust port 89.

For actuating the supply valve 76 to unseated position, and for actuating the release valve 86 to seated position, there is provided a lever mechanism comprising a lever 90 pivotally secured intermediate its ends to and carried by a floating pivot carrier 91 at 92. The pivot carrier 91 is slidable in a bore 93 and supported in alignment therewith by a lug or bracket 94.

Pivotally secured to the lower end of the lever 90 is a stem 95 having one end disposed in a coacting slot in the supply valve 76. Pivotally secured to the upper end of the lever 90 is a roller 96, which is adapted to engage the outermost end of the release valve 86.

It is to be here understood that the release valve spring 87 is a lighter spring than the supply valve spring 78, and that both of these springs are lighter than the regulating spring 82. As a consequence, when the pivot carrier 91 is actuated to the right, the release valve 86 will first seat, the lever 90 pivoting about its lower end for this movement, and thereafter the lever will pivot about its upper end to unseat the supply valve 76. When the pivot carrier 91 is moved to the left, the reverse of this sequence takes place.

Figure 5:
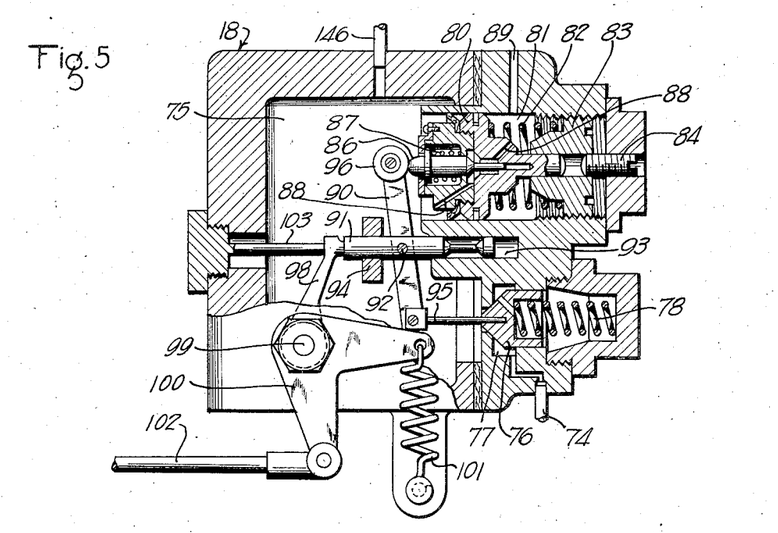
Figure 5 is a partly diagrammatic view of the brake valve device shown in Figure 1A.

For actuating the pivot carrier 91 to the right, there is provided an operating lever 98 rigidly secured to a shaft 99. Secured to an outer end of the shaft 99 is a bell crank lever 100, which is normally urged in a clockwise direction by a spring 101. When the bell crank lever 100 is rotated in a clockwise direction, operating lever 98 actuates the pivot carrier 91 to the right to perform the operations above set forth. Rotation of the bell crank lever 100 is regulated by manipulation of a rod 102 pivotally secured to an arm of the bell crank lever. In the view shown in Figure 5, the parts are in normal release position, springs 78 and 87 and rod 102 urging the pivot carrier 91 to the left, positioning the operating lever 98 against a stop 103.

The inertia operated mechanism 32 comprises a base plate 105 having disposed thereon three rolling bodies 106, 108 and 110. Each of these bodies is mounted on wheels 111 in a manner such that the frictional resistance during movement of each body is reduced to a minimum.

The body 106 is normally biased to a position against stops 112 by a spring 114. The body 108 is biased to a position against a stop 115 by a spring 116, which is lighter than the spring 114. It is to be noted that the spring 116 reacts against the body 106, while the spring 114 reacts against a stop 117. Movement of the two bodies 106 and 108 is guided by a rod 118 which passes through apertures in the two bodies, and which has one end secured to the stop 117 and the other secured to the stop 115.

The body 110 is urged to a biased position against a stop 120 by a spring 122, which is to be understood as being a duplicate of the spring 114. Movement of the body 110 is also guided by a rod 123 which passes through an aperture in the body and has one end secured to the stop 117 and the other secured to the stop 120. The spring 122 reacts against the stop 117, in the same manner as the aforementioned spring 114.

Figures 1, 2:
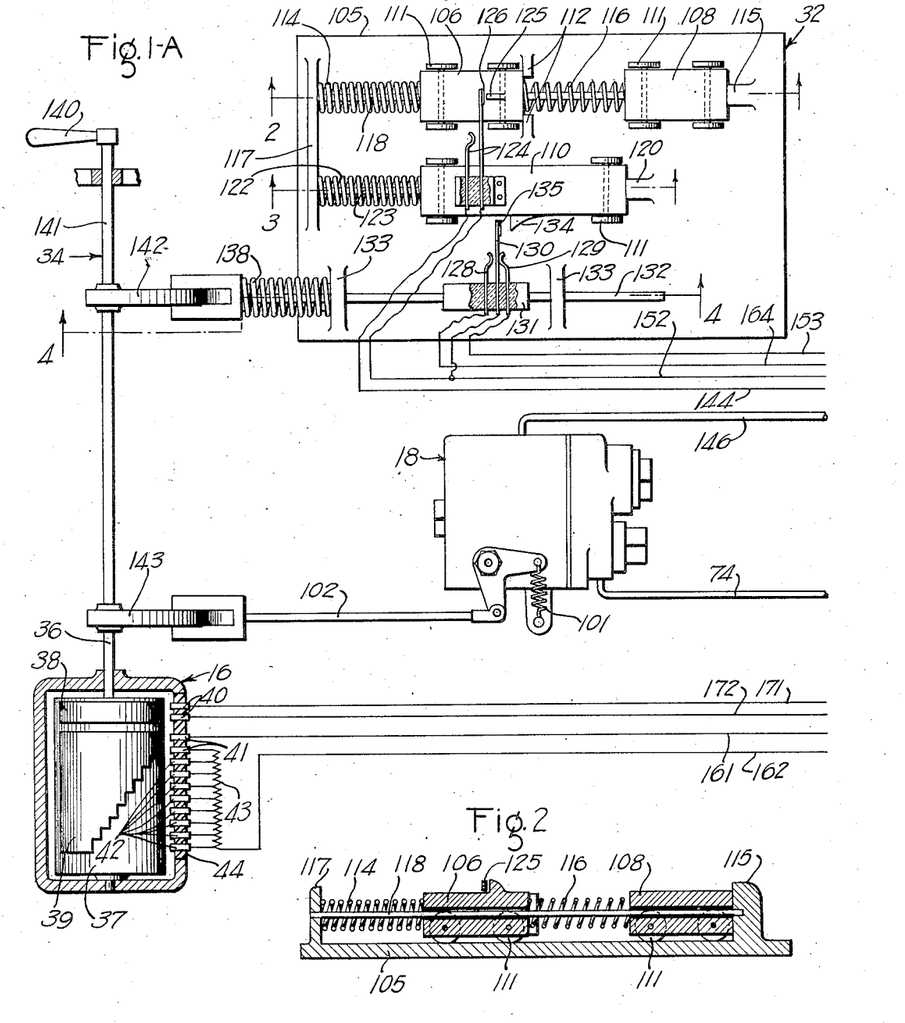
Figure 2 is a view along the line 2—2 of a portion of the inertia operated mechanism shown in Figure 1A.
Figure 1:
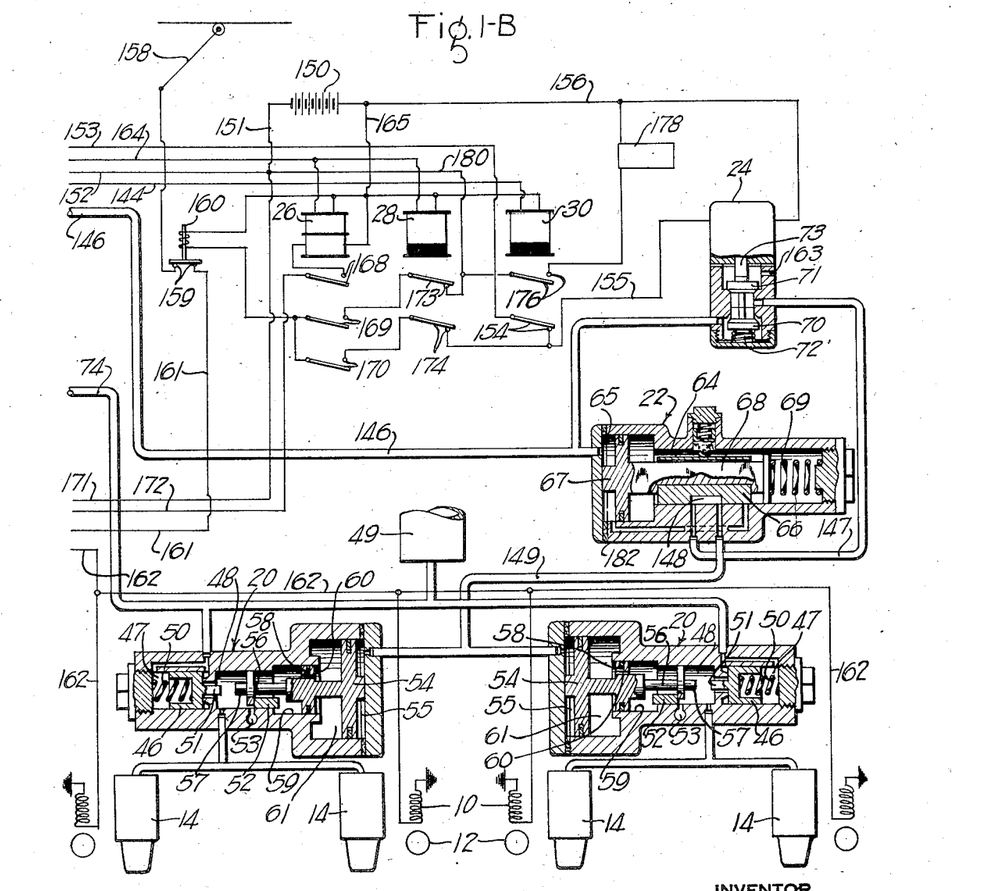
Figure 3:
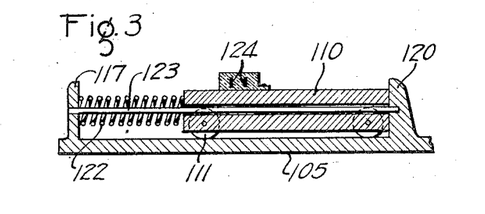
Figure 3 is a similar view along the line 3—3 of Figure 1A.

Carried by and insulated from the body 110 are two contacts 124. These contacts are adapted to be normally open and are adapted to be closed by engagement of a lug 125 on the body 106 with an insulating element 126 mounted on the end of the longer of the two contacts, as will be apparent from the view in Figure 1A.

Also disposed on the base plate 105, and movable relative thereto, are two other contacts 128 and 129, each of which is adapted to be engaged by a third contact 130. These three contacts are carried by an insulating member 131 disposed on a rod 132 slidable in apertures of lugs 133. The contact 130 is normally in engagement with the contact 129, but may be disengaged therefrom and caused to engage the contact 128 by a lug 134 on the body 110, the lug engaging an insulating element 135 on the end of the contact 130.

The contact group 128, 129 and 130 is urged toward the left by a spring 138, but the position of the contact group is determined by operation of the control mechanism 34, as will more fully hereinafter appear.

The inertia operated mechanism 32 is positioned on the vehicle, so that when the vehicle is decelerating, the three bodies 106, 108 and 110 are urged toward the left, against opposition of the springs above described. Now the weights of the three bodies are proportioned so that the two bodies 106 and 108 have the same weight, while the body 110 has a weight twice that of either of the other two bodies.

When the brakes are applied and the vehicle begins to decelerate, the body 110 will move to the left according to the rate of deceleration. At the same time, bodies 106 and 108 will also move to the left, but each of these bodies moves under a force of inertia equal to one-half of the force of inertia which moves the body 110. If the two bodies 106 and 108 were to maintain their relative positions during movement as in their biased positions it will be obvious that spring 114 will be compressed only half as much as spring 122.

However, the body 108 will ultimately transmit its force of inertia to the body 106 by compressing spring 116. The body 108 must therefore move further than the body 106, and the time interval required for this to take place causes the body 110 to move to its balanced position to the left before the body 106 reaches its balanced position to the left. Or in other words, due to the intervention of spring 116 between the two bodies 106 and 108, the body 110 always moves ahead of the body 106, the two bodies however coming to rest directly adjacent each other, with the springs 114 and 122 compressed to the same degree.

Now when the brakes are released, a like phenomenon takes place. The body 110 will immediately move to the right according to the decrease in force of inertia, while the movement of body 106 will be delayed until the body 108 will have moved far enough to the right to release the pressure in the compressed spring 116. The earlier movement of the body 110 causes contacts 124 to be closed by the engagement with the lug 125 on the body 106. This will however cause only a momentary engagement of contacts 124, but is sufficient for the purpose intended, as will more fully appear presently.

When the body 110 moves to the left during deceleration, the lug 134 disengages contact 130 from contact 129, and causes contact 130 to engage contact 128, for a purpose which will be described shortly.

The handle mechanism 34 comprises an operating handle 140 secured to a shaft 141, which may be an extension of the aforementioned shaft 36, or a separate shaft coupled thereto.

Figure 4:
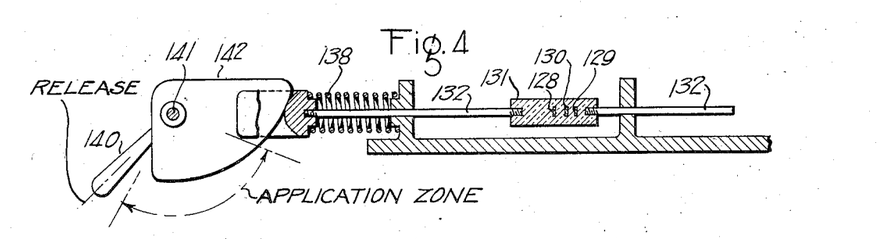
Figure 4 is yet another similar view along the line 4—4 of Figure 1A.

Disposed on the shaft 141 are two cams 142 and 143. The cams 142 and 143 are similar, and of the general configuration shown in Figure 4. As shown in Figure 4, the handle 140 has a "Release" position, and is movable through an "Application zone". When moved through the "Application zone" the cam 142 permits spring 138 to actuate the contact group 128, 130 and 129 to the left. At the same time, cam 143 permits spring 101 to actuate the pivot carrier 91, in the brake valve device 18, to the right a corresponding degree. And in addition, the drum 37, of the current controlling device 16, is likewise rotated, so that manipulation of the single handle 140 operates all of the control devices in synchronism to effect a proper and desired control of the brake application.

The operation of this embodiment of my invention is as follows:

In the drawings the parts have been illustrated for a release condition of the brakes, so that neither the fluid pressure friction brakes nor the eddy current brakes are effective in producing a retarding force on the vehicle or train.

When it is desired to effect an application of the brakes, the handle 140 is moved through the "Application zone" to a degree according to a desired degree of braking. This movement of the handle results in positioning the contact group 128, 129, and 130 to the left, operation of the pivot carrier 91 in the brake valve device 18 to the right, and rotation of the drum 37 to some current supplying position.

When the pivot carrier 91 is actuated to the right, the release valve 86 is first seated, to close the communication between the pressure chamber 75 and the atmosphere, and the supply valve 76 is next unseated, to supply fluid under pressure from the reservoir 49 to the pressure chamber, by way of pipe 74, valve chamber 77 and past the unseated supply valve 76. From the pressure chamber 75, fluid flows through pipe 146, past unseated supply valve 70 in the magnet valve device 24, pipe 147, cavity 148 in slide valve 66 of the cut-off valve device 22, and pipe 149 to piston chamber 55 in each relay valve device 20. Each piston 54 is then actuated toward application position, to first blank off exhaust port 53 and to thereafter unseat poppet valve 46, to supply fluid under pressure from the reservoir 49 to the brake cylinders 14, to a degree corresponding to that supplied to piston chamber 55.

Magnet valve device 24 is energized at this time to hold supply valve 70 unseated and release valve 71 seated, through the engagement of contacts 129 and 130, the circuit to the magnet valve device including, beginning at a battery 150, conductors 151 and 152, contacts 129 and 130, conductor 153, contacts 154 of relay 30, conductor 155, magnet valve device 24, and conductor 156.

Fluid under pressure also flows from the pressure chamber 75 to piston chamber 65 in the cut-off valve device 22, but the spring 69 is designed to hold piston 67 in its biased position to the left, and hence maintain communication between pipes 147 and 149, for all pressures in piston chamber 65 below a predetermined value, which is higher than that normally employed for making service applications of the brakes.

At the same time fluid under pressure is supplied to the brake cylinders as just described, contact segment 39, of current controlling device 16, has connected together contact fingers 41, to connect windings 10 to a source of power supply, by way of trolley 158, contacts 159 of a circuit breaker 160, conductor 161, resistance 43, and conductors 162. The windings 10 are thus energized according to the amount of the resistance 43 remaining in circuit.

With both the fluid pressure and eddy current brakes applied, the vehicle or train will immediately begin to decelerate, and the three bodies 106, 108 and 110, of the inertia operated mechanism 32, will be urged to the left. Now the parts are so designed that the rate of retardation will always reach a value such that lug 134 on body 110 engages contact 130, to disengage it from the contact 129, and cause it to engage contact 128.

Disengagement from the contact 129 opens the circuit to the magnet valve device 24, whereupon spring 72 will seat supply valve 70 and unseat release valve 71. The supply of fluid under pressure to the relay valve piston chambers 55 will then be cut off, and the pressure in these chambers will be released to the atmosphere, through an exhaust port 163 in the magnet valve device. The fluid pressure brakes will thus be released when a braking effect exceeding a chosen value, which is determined by the position of the contact group 128, 129 and 130, has been attained.

When contact 130 engages contact 128, both of relays 26 and 28 will be energized. The circuit to these two relays, beginning from the battery 150, includes conductors 151 and 152, contacts 128 and 130, and conductor 164, which connects with both relays, the return circuit to the battery 150 being by way of conductor 165.

Energization of the relay 26 causes it to close its contacts 168, 169 and 170, closing of contacts 168 serving to energize a holding coil on the relay through a circuit which includes, beginning at battery 150, conductors 151 and 171, contact fingers 40, conductor 172, contacts 168, the holding coil of the relay, and conductor 165. The relay is therefore maintained energized through this holding circuit, until the current controlling device 16 is again operated to release position. Closing of the other contacts of this relay performs no functions at this time.

Although relay 28 opens its contacts 173 and 174 at the same time the contacts of relay 26 are closed, no function is performed at this time, but the two relays are merely conditioned to be in readiness to perform functions hereinafter to be described.

Now the positioning of the contact group 128, 129 and 130 and the rotation of the drum 37 in the current controlling device 16 are so coordinated that the braking effect produced by the eddy current brakes during their effective period is sufficient to maintain the body 110 to the left far enough to hold contacts 128 and 130 in engagement. With the eddy current brakes thus maintained energized at a substantially constant value, the rate of retardation will be according to the speed-torque characteristic of the eddy current brakes.

If however the braking effect produced by the eddy current brakes should be so great as to cause some of the wheels to slip, then the rate of retardation will immediately decrease and the body 110 will move to the right. When it does so, contact 130 disengages from contact 128 and contacts 124 will be momentarily closed, due to the movement of the body 110 ahead of the movement of the body 106.

Disengagement of contact 130 from contact 128 will however deenergize only the relay 28, the relay 26 being maintained energized through the aforementioned holding circuit. However, relay 28 is of the slow release type and will not permit its contacts 173 and 174 to close until a predetermined interval of time will have elapsed.

Closing of contacts 124 energizes relay 30 which will immediately open its contacts 154 and close its contacts 176. The circuit to the relay 30 from battery 150 includes conductors 151 and 152, contacts 124, conductor 144, relay 30 and conductor 165. The energization of this relay will be only momentary, as before described, but this relay is also of the slow release type, so that before it will have opened contacts 176 and closed contacts 154, it will have supplied current to a sanding device 178 to cause the rails to be sanded, and will have at the same time opened the circuit to the magnet valve device 24, so as to preclude any possibility of fluid under pressure being supplied to the brake cylinders during slipping of the wheels.

When the wheels commence to slip the braking effect of the eddy current brakes decreases, but with sand deposited on the rails the adhesion between wheels and rails increases sufficiently for the slipping wheels to immediately commence to roll at or near normal speed again and the eddy current braking effect then increases. Thus the braking effort of these wheels is that due to rolling wheels instead of that due to sliding wheels, which would be very much less.

As soon as the wheels approach substantially normal speed the rate of retardation will have increased to the point where contacts 128 and 130 again engage and relay 28 is reenergized. The release time of this relay is designed to be slow enough to permit the rate of retardation to thus pick up before it will have closed its contacts 173 and 174, so that this relay will hold its contacts open for practically the entire time the eddy current brakes are effective, even though slipping or sliding of the wheels occurs.

The release time of relay 30 is also designed to prevent closing of contacts 154 before the rate of retardation will have again reached the former rate, so that the possibility of a fluid pressure brake application is prevented.

If no further slipping of the wheels occurs, the eddy current brakes will remain fully effective until a speed is reached at which the eddy current braking effect begins to decrease, due to the decrease in speed of the vehicle.

When this point is reached, the rate of retardation begins to decrease and the body 110 moves to the right to permit contact 130 to disengage from contact 128 and to engage contact 129, but does not move fast enough to cause closing of contacts 124. Magnet valve device 24 will then be energized, whereupon fluid under pressure will flow to the relay valve devices 20, to supply fluid under pressure to the brake cylinders 14.

Disengagement of contact 130 from contact 128 deenergizes relay 28, which after a definite interval of time will permit its contacts 173 and 174 to close. Closing of contacts 173 will cause energization of the circuit breaker 160 and this circuit breaker will open its contacts 159, to deenergize the eddy current brakes. The eddy current brakes are thus cut out a short time after the fluid pressure brakes are cut in. The circuit to the circuit breaker 160, includes, beginning at battery 150, conductors 151 and 180, contacts 173, contacts 169, circuit breaker 160, and conductor 165.

Closing of contacts 174 forms another circuit to the magnet valve device 24, including, beginning at the battery 150, conductors 151 and 180, contacts 173, 169, 170 and 174, conductor 155, magnet valve device 24, and conductor 156. This circuit provides for sustained energization of the magnet valve device should relay 30 be subsequently energized due to relative movement between the bodies 106 and 110 as the vehicle or train comes to a stop.

Now the parts are so designed that the braking effect produced by the fluid pressure brakes increases just fast enough to insure stopping of the train and holding it at rest. Even though the eddy current braking effect is decreasing, it in itself is sufficient and substantially effective in bringing the train to a stop, but it is desirable that the two braking effects shall overlap to insure a more prompt stop, especially on grades.

It will thus be seen that the interlock arrangement provided prevents applications of the fluid pressure brakes for wheel slipping conditions but operates to cut in the fluid pressure brakes when the effectiveness of the eddy current brakes decreases and remains decreased.

When it is desired to effect a complete release of the brakes, the handle 140 is moved to "Release" position, whereupon the brake valve device 18 is operated to entirely release the fluid pressure brakes, and the current controlling device 16 is operated to deenergize the eddy current brake windings 10.

It is to be noted that the operator may select any desired degree of braking by moving the handle 140 to different positions in the "Application zone", and that thereafter the parts function automatically to cut out the fluid pressure brake when the desired braking is obtained; and when the eddy current braking decreases at the end of the stop, the fluid pressure brakes are cut in and then a little later the eddy current brakes are cut out.

If at any time the eddy current brakes are applied there should be a failure of the power supply, as should the trolley 158 leave the trolley wire, then the eddy current brake windings will be deenergized and the resulting decrease in the rate of retardation will cause the body 110 to move to the right, ahead of the body 106. Contacts 124 will then be momentarily closed, relay 30 will be energized, magnet valve device 24 deenergized, and the fluid pressure brakes thus released. After a definite interval of time the relay 30 will close its contacts 154, to again energize the magnet valve device 24 to apply the fluid pressure brakes.

When the rate of retardation increases due to the reapplication of the fluid pressure brakes, body 110 will open contacts 129 and 130 and again deenergize the magnet valve device 24. Thereafter the cycle will repeat itself until the vehicle stops or the power supply comes back on. It will thus be seen that the fluid pressure brakes are cut into action upon the loss of power supply to the eddy current brakes.

The degree of application of the fluid pressure brakes is controlled according to the position of the pivot carrier 91 in the brake valve device 18. The position of this pivot carrier determines the amount the supply valve 76 is opened. Therefore, the pressure will build up in the pressure chamber 75 until the movable abutment 80 is actuated far enough to the right to seat the supply valve 76. The supply is then lapped.

If while the fluid pressure brakes are applied the power supply should come back on, the rate of retardation would increase, and contact 130 would disengage from contact 129 and re-engage contact 128. Magnet valve device 24 would then again be deenergized and the fluid pressure brakes be cut out of action. Thereafter the apparatus would function as during a normal service application of the brakes.

If it is desired to effect a graduated application of the brakes by progressively moving the handle 140 into the "Application zone", this may be accomplished in the manner commonly employed in manipulating the ordinary brake valve device. The release time of relay 28 will in all cases be great enough so that the increased rate of retardation for each progressive step will be attained before the relay will have closed its contacts. This insures that the eddy current brakes will not be cut out of action between each step.

When it is desired to effect an emergency application of the brakes, the handle 140 is moved to the extreme end of the "Application zone". In this position the drum 37 of the current controlling device is rotated to cut out all of the resistance 43, and to thereby energize the eddy current brake winding 10 to a maximum degree. The brake valve device 18 is also operated to supply the maximum degree of fluid under pressure to the pressure chamber 75. This pressure will be sufficient to actuate piston 67 in the cut-off valve device 22 to cause slide valve 66 to blank the passage connecting with pipe 147 and to connect pipe 149 with a passage 182 leading to the piston chamber 65, so that fluid under pressure is supplied direct from the brake valve device 18 to the relay valve devices 20.

An emergency application is intended to be used only when the inertia operated mechanism 32, or the relays 26, 28 and 30 are inoperative. Therefore, both the eddy current brakes and the fluid pressure brakes may be applied to a maximum degree, as the magnet valve device 24 will have been by-passed. If, however, the circuit to the eddy current brake windings is opened by energization of circuit breaker 160, due to faulty operation of the relays, then the fluid pressure brakes only will be applied. These will however be adequate to stop the vehicle or train.

It is to be pointed out that the design of the cams 142 and 143 will have to be determined experimentally. For each position of the contact group 128, 129 and 130 there is a corresponding position of the drum 37 and the pivot carrier 91. Therefore, for each degree of excitation of the eddy current brake windings, as the speed of the vehicle decreases a point will be reached where the effectiveness of the eddy current brakes decreases, contacts 129 and 130 engage, and the fluid pressure brakes thus cut in.

Figure 6:
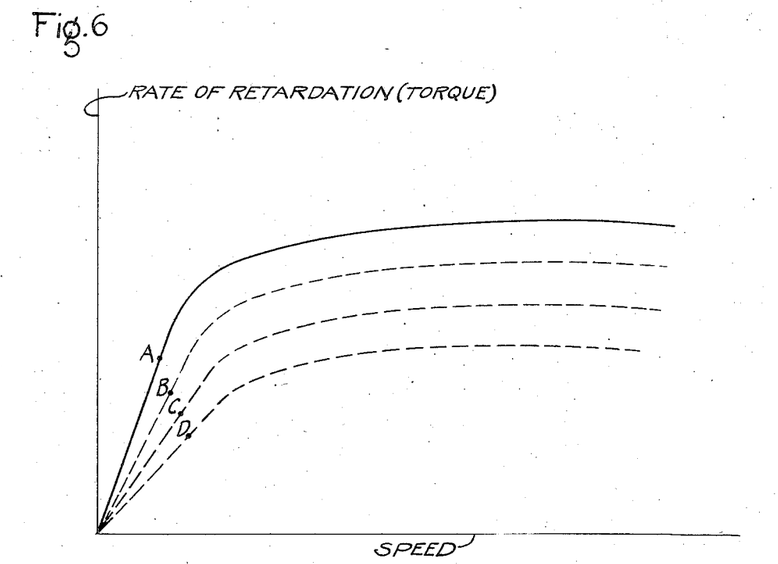
Figure 6 is a graph depicting certain operating characteristics of the eddy current brake, shown somewhat in exaggerated form.

For example, referring to Figure 6, I have shown four curves which have been drawn to illustrate the relation between speed of the vehicle and rate of retardation, or torque, due to application of the eddy current brakes. Considering first the solid line curve, if the eddy current brakes are applied at some high speed, then as the speed decreases the braking effect will decrease, until at some point, as that represented by the letter A, the rate of retardation has decreased to about half of its most constant value. The fluid pressure brakes can then be cut in with fluid supplied to the brake cylinders at some pressure determined experimentally to be about right to bring the vehicle or train to a stop at a rate not exceeding the above referred to half value.

In a similar manner, if the eddy current brake windings are energized to a lower degree, the fluid pressure brakes can be cut in with some predetermined braking effect at points represented by the letters B, C and D on the other three curves. The proper design of the cams 142 and 143 are thus determined.

While I have illustrated and described my invention in connection with one embodiment thereof, it will be apparent to those skilled in the art that many modifications and changes therein may be made, and I do not therefore wish to be limited to the particular embodiment shown, nor otherwise than by the spirit and scope of the appended claims.

Having now described my invention, what I claim as new and desire to secure by Letters Patent, is:

1. In a vehicle brake system, in combination, fluid pressure brake means, electric brake means, means for supplying fluid under pressure to the fluid pressure brake means, means for supplying current to the electric brake means, an inertia operated mechanism operated according to the rate of retardation of the vehicle, and means responsive to operation of said inertia operated mechanism at a chosen rate of retardation for cutting one of said brake means out of action.

2. In a vehicle brake system, in combination, fluid pressure brake means, electric brake means, means for supplying fluid under pressure to the fluid pressure brake means, means for supplying current to the electric brake means, contacts adapted to be manually moved to different positions, means operated according to the rate of retardation of the vehicle for operating said contacts, and means controlled by said contacts for cutting one of said brake means out of action at a chosen rate of retardation.

3. In a vehicle brake system, in combination, a fluid pressure brake means, electric brake means, means for supplying fluid under pressure to the fluid pressure brake means, means for supplying current to the electric brake means, normally closed contacts, inertia operated means for opening said normally closed contacts at a chosen rate of retardation of the vehicle, an electroresponsive valve means responsive to opening of said contacts for cutting off the supply to and for effecting a release of the fluid pressure brake means.

4. In a vehicle brake system, in combination, a brake cylinder, an electrodynamic brake device, means for supplying fluid under pressure to the brake cylinder, means for supplying current to the electrodynamic brake device, a normally energized electrically operated valve device operable when deenergized to effect a cutting off of the supply to the brake cylinder and to effect a release of fluid under pressure from the brake cylinder, normally closed contacts, means operated at a chosen rate of retardation of the vehicle for opening said normally closed contacts, and means responsive to opening of said contacts for deenergizing said electrically operated valve device.

5. In a vehicle brake system, in combination, a brake cylinder, an eddy current brake device having an exciting winding, means for supplying fluid under pressure to the brake cylinder, means for supplying current to said winding, a normally energized magnet valve device operable when de-energized to effect a cutting off of the supply to the brake cylinder and to effect a release of fluid under pressure from the brake cylinder, a circuit for supplying current to energize said magnet valve device, normally closed contacts in said circuit, means for positioning said contacts away from a biased position a distance according to a desired braking effect, and inertia operated means operable at said desired braking effect to open said normally closed contacts.

6. In a fluid pressure brake system, in combination, a brake cylinder, an eddy current brake device having an exciting winding, a control mechanism having a handle operable to different degrees, brake valve means for supplying fluid under pressure to the brake cylinder according to the degree of movement of said handle, current controlling means for supplying current to said winding also according to the degree of movement of said handle, contacts adapted to be operated from a biased position to a distance also corresponding to the degree of movement of said handle, inertia operated means operated according to the rate of retardation of the vehicle for operating said contacts, and means responsive to operation of said contacts by said inertia operated means for cutting off the supply to the brake cylinder and for releasing fluid under pressure from the brake cylinder.

7. In a vehicle brake system, in combination, fluid pressure brake means, electric brake means, means for supplying current to the electric brake means, means operable when the effectiveness of the electric brake means diminishes below a predetermined value for supplying fluid under pressure to the fluid pressure brake means, and means for preventing supply of fluid under pressure to the fluid pressure brake means when the decrease in effectiveness of the electric brake means is due to slipping of the wheels.

8. In a vehicle brake system, in combination, fluid pressure brake means, electric brake means for producing a braking effect according to the speed of rotation of the vehicle wheels, means for supplying current to the electric brake means, means for supplying fluid under pressure to the fluid pressure brake means, an inertia operated mechanism having two bodies independently operated according to the rate of retardation of the vehicle, means responsive to operation of one of said bodies for cutting off the supply to and for releasing fluid under pressure from the fluid pressure brake means, means operable when the effectiveness of the electric brake means diminishes below a predetermined value for resupplying fluid under pressure to the fluid pressure brake means, and means governed by operation of both of said bodies for preventing said resupply to the fluid pressure brake means when the decrease in effectiveness of the electric brake means is due alone to wheel slipping.

9. In a vehicle brake system, in combination, a brake cylinder, an electric brake device operable to produce a braking effect which decreases in effectiveness at low vehicle speeds, means for supplying current to the electric brake device, means operable when the electric brake device is effective for rendering the brake cylinder ineffective to produce a braking force, an inertia operated mechanism having two bodies independently operated according to changes in the rate of speed of the vehicle, one of said bodies being adapted to move ahead of the other of said bodies upon a change in the rate of speed of the vehicle, means rendered operable upon a predetermined decrease in effectiveness of the electric brake device for supplying fluid under pressure to the brake cylinder, and means governed by relative movement between said two bodies for preventing said supply to the brake cylinder during slipping of the vehicle wheels.

10. In a vehicle brake system, in combination, a brake cylinder, an electric brake device having an exciting winding and being operable to produce a braking effect which diminishes as the speed of the vehicle diminishes, means for supplying current to said winding to cause said electric brake device to produce a braking effect, means operable while said electric brake device is effective for preventing supply of fluid under pressure to the brake cylinder and operable when the effectiveness of the electric brake device decreases for effecting a supply to the brake cylinder, an inertia operated mechanism having one body movable directly according to the rate of speed change of the vehicle and a second body movable with delayed motion also according to the rate of speed change of the vehicle, contacts carried by one of said bodies and being adapted to be operated by the other of said bodies during speed changes of the vehicle, said contacts being operated when the effectiveness of the electric brake device decreases due to slipping of the vehicle wheels, and means controlled by said contacts for preventing supply of fluid under pressure to the brake cylinder when the decrease in effectiveness of the electric brake device is due alone to slipping of the vehicle wheels.

11. In a vehicle brake system, in combination, a brake cylinder, an electric brake device, means for supplying current to said electric brake device, said electric brake device being operable to produce a braking effect which diminishes in effectiveness at low vehicle speeds, a first body and a second body movable in parallel pathways according to the rate of speed change of the vehicle, means for causing one of said bodies to move with a delayed time interval, contacts carried by one of said bodies and adapted to be operated by the other when said bodies are caused to move due to a change in the rate of speed of the vehicle, means responsive to operation of said contacts for causing sand to be deposited on the track rails, and means also responsive to operation of said contacts for delaying the supply of fluid under pressure to the brake cylinder for a chosen interval of time.

12. In a vehicle brake system, in combination, a brake cylinder, an electric brake device, means for supplying current to the electric brake device, means operable while the electric brake device is effective in producing a desired braking effect for preventing supply of fluid under pressure to the brake cylinder, means operable when the electric braking effect diminishes below a predetermined value for effecting a supply of fluid under pressure to the brake cylinder, and means for delaying said supply to the brake cylinder for a definite interval of time.

13. In a vehicle brake system, in combination, a brake cylinder, an electric brake device operable to produce a braking effect which diminishes at low vehicle speeds, means for supplying current to the electric brake device, means for supplying fluid under pressure to the brake cylinder, normally closed contacts, inertia operated means for opening said contacts, means responsive to opening of said contacts for cutting off the supply to and releasing fluid under pressure from the brake cylinder, means operable upon a decrease in the braking effect produced by the electric brake device for resupplying fluid under pressure to the brake cylinder, and means for delaying said resupply for a chosen length of time.

14. In a vehicle brake system, in combination, a brake cylinder, an electric brake device operable to produce a braking effect which diminishes at low vehicle speeds, means for supplying current to the electric brake device, means operable while the electric brake device is effective for preventing supply of fluid under pressure to the brake cylinder and operable when the electric brake device decreases in effectiveness for supplying fluid under pressure to the brake cylinder, a first body and a second body adapted to be operated according to the rate of change in the speed of the vehicle, means for delaying movement of one body with respect to movement of the other body, contacts carried by one of said bodies and adapted to be operated upon relative movement between said bodies, said bodies being adapted to be operated with relative movement therebetween upon a sudden decrease in effectiveness of the electric brake device, and a relay adapted to be energized when said contacts are so operated to prevent a supply of fluid under pressure to the brake cylinder and operable when deenergized to effect after a predetermined interval of time a supply of fluid under pressure to the brake cylinder.

15. In a vehicle brake system, in combination, fluid pressure brake means, electric brake means, means for supplying fluid under pressure to effect an application of the fluid pressure brake means, means for supplying current to the electric brake means, electroresponsive valve means adapted to be operated to cut off the fluid supplied to effect an application of the fluid pressure brake means so long as the electric brake means is effective, and a valve device operated upon a predetermined pressure of the fluid supplied to effect an application of the fluid pressure brake means for preventing the cutting off of said supply.

16. In a vehicle brake system, in combination, a brake cylinder, an electric brake device, a relay valve device for controlling the supply of fluid under pressure to the brake cylinder, a self-lapping brake valve device operable to supply fluid under pressure to operate said relay valve device, a current controlling device operable to supply current to said electric brake device to different degrees, normally closed movable contacts having a biased position, manually operated control means for operating said contacts away from said biased position and for operating said brake valve device and current controlling device according to a desired braking effect, inertia operated means operated according to the rate of retardation of the vehicle for opening said normally closed contacts, means responsive to opening of said contacts for cutting off the supply from said brake valve device to said relay valve device and for releasing fluid under pressure supplied to operate the relay valve device, and valve means operated upon a predetermined increase in pressure of fluid supplied by said brake valve device for resupplying fluid under pressure to operate said relay valve device.

17. In a vehicle brake system, in combination, brake means, a first body movable according to the rate of retardation of the vehicle, a second body movable in a parallel pathway also according to the rate of retardation of the vehicle, resilient means for opposing movement of each of said bodies, a third body movable in the same pathway as said second body also according to the rate of retardation of the vehicle, resilient means interposed between said second and third bodies and adapted to transmit forces between said bodies, said third body being operable to cause said second body to respond to changes in the rate of retardation of the vehicle slower than said first body, contacts carried by said first body, means carried by another of said bodies for operating said contacts, and means controlled by said contacts for controlling said brake means.

18. In a vehicle brake system, in combination, brake means, a first body adapted to roll in a linear pathway according to the rate of retardation of the vehicle, a first spring for opposing movement of said body, a second body adapted to roll in a linear pathway parallel to that of said first body also according to the rate of retardation of the vehicle, a second spring for opposing movement of said second body, a third body adapted to roll in said second pathway also according to the rate of retardation of the vehicle, a third spring interposed between said second and third bodies and adapted to transmit forces between said two bodies, said third body being operable to delay movement of said second body with respect to movement of said first body upon either an increase or decrease in the rate of retardation of the vehicle, a set of contacts, means for operating said contacts when said first body moves relative to said second body, and means controlled by said contacts for controlling said brake means.

19. In a vehicle brake system, in combination, brake means, a first body and a second body and a third body all movable according to the rate of retardation of the vehicle, resilient means for opposing movement of said first and second bodies in one direction, resilient means interposed between said second and third bodies and adapted to transmit forces between said bodies, said third body being operable to delay movement of said second body with respect to movement of said first body upon changes in the rate of retardation of the vehicle, a normally closed and a normally open contact adapted to be opened and closed respectively by said first body, a second group of normally open contacts carried by said first body and adapted to be operated by said second body upon relative movement between said first and second bodies, and means controlled by said two groups of contacts for controlling said brake means.

20. In a vehicle brake system, in combination, a brake cylinder, means for effecting a supply of fluid under pressure to the brake cylinder, a normally energized magnet valve device operable when deenergized to effect a cutting off of the supply to the brake cylinder and to release fluid under pressure from the brake cylinder, a circuit for energizing said magnet valve device, normally closed contacts in said circuit, inertia operated means operated according to the rate of retardation of the vehicle for opening said contacts, and a valve device operated upon a predetermined increase in pressure for effecting a resupply of fluid under pressure to the brake cylinder.

21. In a vehicle brake system, in combination, an electric brake device, a brake cylinder, means for supplying current to the electric brake device, means for supplying fluid under pressure to the brake cylinder, means operable while the electric brake device is effective for cutting off the supply to and releasing fluid under pressure from the brake cylinder, and means operable when the effectiveness of the electric brake device decreases below a chosen value for effecting a resupply of fluid under pressure to the brake cylinder and for deenergizing the electric brake device.

22. In a vehicle brake system, in combination, a brake cylinder, an electric brake device, means for supplying fluid under pressure to the brake cylinder, means for supplying current to the electric brake device, a normally closed contact and a normally open contact, inertia operated means operated according to the rate of retardation of the vehicle for opening said normally closed contact and for closing said normally open contact, said normally open contact being adapted to be reopened when the rate of retardation diminishes due to decrease in effectiveness of the electric brake device, means responsive to opening of said normally closed contact for cutting off the supply to and for releasing fluid under pressure from the brake cylinder, a first relay and a second relay adapted to be energized upon closing of said normally open contact, means operable upon energization of said first relay for forming a holding circuit for said relay, and a circuit closable upon deenergization of said second relay when said normally open contact is reopened and when said first relay is energized for causing fluid under pressure to be resupplied to the brake cylinder.

23. In combination, a first body adapted to be moved by force of inertia in a linear pathway, resilient means for opposing movement of said body in one direction and operable to actuate said body to a biased position upon absence of said force of inertia, a second body adapted to be moved by force of inertia in a linear pathway parallel to said first pathway, a second resilient means for opposing movement of said second body in one direction and operable to actuate said second body to a biased position when said force of inertia is absent, a third body also movable by force of inertia in said second linear pathway, a third resilient means interposed between said second and third bodies, said third body being operable to transmit its force of inertia to said second body through said third resilient means with a delayed time interval, said third resilient means being operable to retain the force of inertia transmitted by said third body to said second body for a predetermined interval of time when the force of inertia on said third body is decreased, whereby said second body is caused to be delayed in movement with respect to movement of said first body, contacts carried by said first body, and means associated with said second body for operating said contacts when all of said bodies are caused to move due to a change in the forces of inertia acting upon said bodies.

24. In a vehicle brake system, in combination, fluid pressure brake means, electric brake means for producing a braking effect according to the speed of rotation of the vehicle wheels, means for supplying current to the electric brake means, means for supplying fluid under pressure to the fluid pressure brake means, an inertia operated mechanism having a first set of contacts operated upon a predetermined increase in the rate of retardation of the vehicle and a second set of contacts operated upon a chosen change in the rate of retardation, means responsive to operation of said first set of contacts for cutting off the supply to and releasing fluid under pressure from the fluid pressure brake means, means operable when the braking effect produced by the electric brake means diminishes below a predetermined value for resupplying fluid under pressure to said fluid pressure brake means, and means responsive to operation of said second set of contacts for delaying said resupply for a definite interval of time.

25. In a vehicle brake system, in combination, an electric brake device, a brake cylinder, means for supplying current to the electric brake device, means for supplying fluid under pressure to the brake cylinder, means operable while the electric brake device is effective for cutting off the supply to and releasing fluid under pressure from the brake cylinder, means operable when the effectiveness of the electric brake device decreases below a chosen value for effecting a resupply of fluid under pressure to the brake cylinder and for deenergizing the electric brake device, and means for delaying for a predetermined interval of time the deenergization of said electric brake device after resupply of fluid under pressure to the brake cylinder has been effected.

26. In a vehicle brake system, in combination, electric brake means operable to produce a braking effect which diminishes as the speed of wheels associated with said brake diminishes, means for supplying current to said electric brake means, and means operable when the effectiveness of the electric brake means diminishes due to slipping of the wheels for causing sand to be applied to the rails.

27. In a vehicle brake system, in combination, an electric brake device operable to produce a braking effect which diminishes in effectiveness at low rotational speeds, means for supplying current to the electric brake device, an inertia operated mechanism having two bodies independently operated according to changes in the rate of speed of the vehicle, one of said bodies being adapted to move ahead of the other of said bodies upon a change in the rate of speed of the vehicle, means for sanding the rails, and means governed by relative movement between the said two bodies for causing said last means to operate to apply sand to the rails.

28. In a vehicle brake system, in combination, an electric brake device operable to produce a braking effect which decreases in effectiveness at low rotational speeds, means for supplying current to the electric brake device, an inertia operated mechanism having one body movable directly according to the rate of speed change of the vehicle and a second body movable with delayed motion also according to the rate of speed change of the vehicle, contacts carried by one of said bodies and being adapted to be operated by the other of said bodies during speed changes of the vehicle, said contacts being operated when the effectiveness of the electric brake device decreases due to slipping of the vehicle wheels, sanding means for sanding the rails, and electro-responsive timing means controlled by said contacts for controlling said sanding means.

29. In a vehicle brake system, in combination, two brake means, means for effecting an application of each of said brake means, means operated according to the rate of retardation of the vehicle, and means responsive to operation of said last means at a chosen rate of retardation for cutting one of said brake means out of action.

30. In a vehicle brake system, in combination, two brake means, means for effecting an application of one of said brake means, means operable when the effectiveness of the applied brake means diminishes below a predetermined value for effecting an application of the unapplied brake means, and means for preventing application of said unapplied brake means when the decrease in effectiveness of the applied brake means is due to slipping of the vehicle wheels.

JOHN W. LOGAN, Jr.